April 12, 1960
W. H. MORRIS
2,932,209
BALL SCREW MECHANISM
Filed Oct. 6, 1958
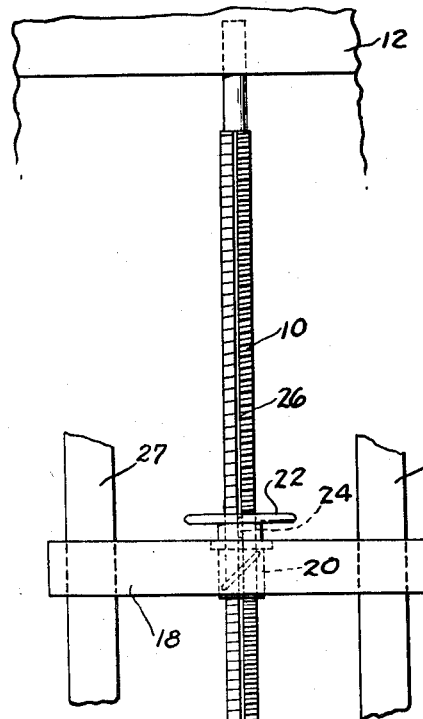
FIG. 1
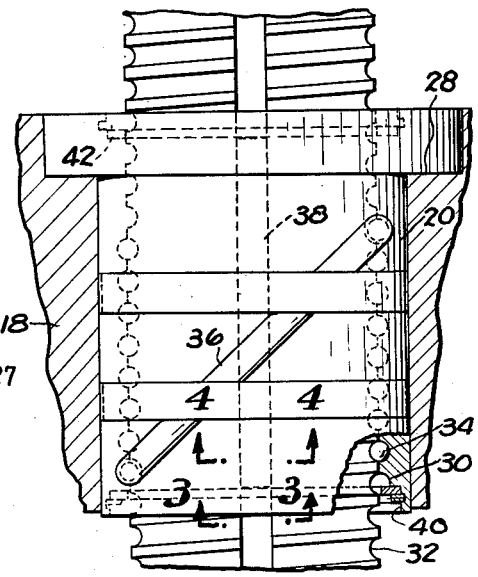
FIG. 2
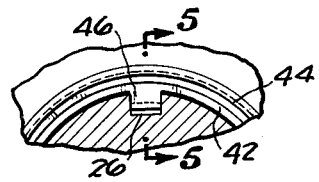
FIG. 3
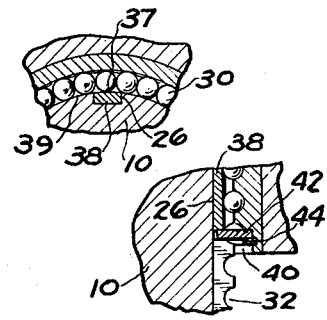
FIG. 4
FIG. 5
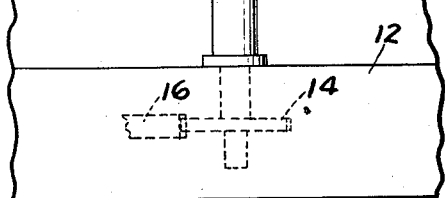
INVENTOR.
WALTER H. MORRIS
BY
Barnes, Kisselle, Raisch
& Choate
ATTORNEYS

United States Patent Office 2,932,209
Patented Apr. 12, 1960

1

2,932,209

BALL SCREW MECHANISM

Walter H. Morris, Rochester, Mich., assignor to Beaver Precision Products, Inc., Clawson, Mich., a corporation of Michigan Application October 6, 1958, Serial No. 765,518

14 Claims. (Cl. 74—424.8)

This invention relates to a ball screw mechanism and more particularly to a mechanism of this type adapted for use with a keyway slotted ball screw.

Ball screws are commonly used in arrangements where a highly efficient drive is desired between a rotatable member and a translatable member. In a conventional arrangement of this type, a driving connection is provided between a screw shaft and a nut by means of a series of balls arranged in juxtaposed helical grooves in the shaft and the nut and means are provided in the nut for recirculating the balls from one end of the helical groove in the nut to the other as the screw and nut are relatively rotated.

It is often desirable to employ such a ball screw arrangement on threaded shafts having a longitudinally extending keyway through the thread with which a driving member for the shaft is slidably engaged by means of a key. In such arrangements, the depth of the keyway required to provide reasonable locking engagement with the key of the driving member is greater than the depth of the ball groove in the shaft. Thus, means must be provided for enabling the balls to roll smoothly across the keyway slot in the shaft which is deeper than the ball groove on the shaft.

The present invention has for its object the provision of a relatively simple ball nut construction for use with a shaft formed with a ball groove and a longitudinally extending keyway in the shaft having a depth greater than the ball groove in the shaft.

More particularly, the invention contemplates a ball nut provided with a helical groove corresponding with the helical ball groove of the shaft and a shoe disposed within the keyway formed in the shaft and retained within the nut. The shoe provides within the axial extent of the groove in the nut a bridge across the keyway slot in the shaft for permitting the balls to roll smoothly across the keyway slot in following the ball grooves in the nut and the screw.

In the drawing:

Fig. 1 is a view generally illustrating the type of an arrangement wherein the present invention is suited for use.

Fig. 2 is a sectional view through a portion of the arrangement shown in Fig. 1 and illustrating the manner in which the ball nut is mounted on the ball screw.

Fig. 3 is a sectional view taken along the line 3—3 in Fig. 2.

Fig. 4 is a sectional view taken along the line 4—4 in Fig. 2.

Fig. 5 is a sectional view taken along the line 5—5 in Fig. 3.

In the drawing, the invention is illustrated in connection with a shaft 10 journalled at its ends in supports 12. At one end, shaft 10 has a gear 14 fixed thereon which meshes with a drive gear 16 for rotating the shaft. In the particular arrangement illustrated, there is supported on shaft 10 for axial movement thereon a non-rotatable guide member 18. Guide member 18 is connected to

2 shaft 10 by means of a ball nut 20. An auxiliary means in the form of a hand wheel 22 is also provided for rotating the shaft intermediate its ends, preferably from adjacent the guide member 18, if desired. Hand wheel 22 has a slidable driving connection with shaft 10 by means of a key 24 on the hand wheel 22 which slidably engages a longitudinally extending keyway 26 on shaft 10. Hand wheel 22 may, if desired, be rotatably journalled on guide member 18 in any suitable manner. Guide member 18 may be supported on fixed ways 27 which prevent rotation of guide member 18 when shaft 10 is rotated.

With the above described arrangement, it will be appreciated that when the shaft 10 is rotated either through the drive between gears 14, 16 or by rotating hand wheel 22, guide member 18 is moved axially along shaft 10. It will also be appreciated that in an arrangement of this type, the guide member 18 might be fixedly supported and the shaft 10 supported for axial movement so that when the shaft is rotated either by the gears 14, 16 or by the hand wheel 22, the shaft 10 is shifted axially through the nut 20.

With respect to the present invention, it matters not whether the nut 20 is stationary and the shaft 10 moves axially through the nut or whether the shaft is stationary and the nut is moved axially along the shaft. The present invention is applicable in any arrangement of the type described where relative axial movement between a nut and a screw or shaft is desired and at the same time it is necessary to provide the shaft with a keyway such as shown at 26 to establish a slidable driving connection with a driving member such as the hand wheel 22. The arrangement illustrated in Fig. 1 is typical of one application, but it will be appreciated that other arrangements are within the scope of the present invention.

Referring more particularly to Fig. 2, nut 20 comprises a cylindrical sleeve formed with an external shoulder 28 at one end; and within this sleeve, the nut is provided with a helical ball groove 30. Shaft 10 is likewise provided with a helical ball groove 32 which corresponds with the groove 30 in the nut. Within the juxtaposed grooves of the nut and the shaft, there is arranged a train of balls 34; and, as is conventional, a ball return tube 36 is provided for recirculating the balls from one end of the groove in the nut to the other end thereof.

Referring now to Figs. 4 and 5, it will be observed that the depth of the keyway slot 26 in shaft 10 is greater than the depth of groove 32 in the shaft. To enable the balls 34 to roll freely across the keyway 26, there is arranged within the keyway a shoe 38. Shoe 38 is dimensioned in thickness such that its radially outer face 37 is generally coplanar with the bottom 39 of the groove 32 in shaft 10 (Fig. 4). The radially outer face 37 of shoe 38 is curved to present a continuously curved smooth surface with respect to the adjacent portions of groove 32. The opposite ends of nut 20 are counter-bored as at 40 to receive washers 42. Washers 42 are preferably formed from a low friction material such as bronze, etc. Washers 42 are held in place within the ends of nut 20 by means of snap rings 44. Each washer 42 is provided with a radially inwardly projecting lug 46 which registers with and projects into keyway slot 26. Shoe 38 is dimensioned in length such that the opposite ends thereof abut against the radially inwardly extending lugs 46 of washers 42 (Fig. 5).

With the above described arrangement, it will be observed that when shaft 10 is rotated relative to nut 20, the balls 34 circulate through the juxtaposed grooves of the nut and shaft and the nut 20 with its guide member 18 moves axially along the shaft. However, washers 42 rotate with shaft 10 within the nut 20; and as the washers advance axially along the shaft with the nut 20, the shoe 38 is likewise carried axially along the shaft in keyway 26 by the interengagement of lugs 46 with the opposite ends of the shoe 38. Thus, the shoe 38 provides within the axial extent of the groove in nut 20 a bridge across keyway 26 over which the balls 34 may roll freely in circulating through the threads of the screw and nut. Thus, the depth of the keyway 26 may be relatively deep to provide ample area for locking engagement with the key 24 on the hand wheel 22; and nevertheless, free rolling movement of the balls 34 across the keyway 26 is afforded by the shoe 38 which moves axially along the shaft with nut 20.

I claim:

1. In combination, a shaft having a helical ball groove, a nut on said shaft having a similar groove, a series of balls interengaging said grooves on the shaft and the nut such that relative rotation of the nut and shaft produces relative translatory movement thereof, said shaft having an axially extending slot therein of a depth greater than the depth of the groove therein and means enabling the balls to roll smoothly in said grooves across said slot comprising a shoe slidably engaged in said slot and movable axially of the shaft with the nut, said shoe extending axially within the portion of the slot traversed by the groove in the nut, said shoe extending radially outwardly in said slot generally to the bottom of the groove in the shaft.

2. The combination set forth in claim 1 including a rotary driving member on said shaft having a key slidably engaging said slot.

3. The combination set forth in claim 2 wherein the key on the driving member provides a slidable rotary driving connection between the shaft and the driving member.

4. In combination, a shaft having a helical ball groove, a nut on said shaft having a similar groove, a series of balls interengaging said grooves on the shaft and the nut such that relative rotation of the nut and shaft produces relative translatory movement thereof, said shaft having an axially extending slot therein of a depth greater than the depth of the groove therein and means enabling the balls to roll smoothly in said grooves across said slot comprising a shoe slidably arranged within the slot and being axially coextensive with at least the portion of the slot traversed by the groove in the nut, and means for retaining the shoe in a generally fixed axial position relative to the nut, said shoe substantially filling the portion of the slot extending radially inwardly from the bottom of the groove in the shaft.

5. The combination set forth in claim 4 wherein the radially outer surface of the shoe is of arcuate shape in radial section with a radius corresponding generally with the radius of the shaft at the bottom of the groove therein.

6. The combination set forth in claim 4 wherein said last mentioned means comprises an annular retainer engaging said shoe and rotatably supported on said nut.

7. The combination set forth in claim 6 including a rotary drive member on said shaft provided with a key slidably engaging the slot in the shaft.

8. In combination, a shaft having a helical ball groove, a nut on said shaft having a similar groove, a series of balls interengaging said grooves on the shaft and the nut such that relative rotation of the nut and shaft produces relative translatory movement thereof, said shaft having an axially extending slot therein of a depth greater than the depth of the groove therein and means enabling the balls to roll smoothly in said grooves across said slot comprising an elongate shoe having a sliding fit in said slot, said shoe extending axially through at least that portion of the slot that is traversed by the groove in the nut, and retainer means adjacent opposite ends of the nut and engaging said shoe to hold the shoe in axially fixed position relative to the nut, said retainer means rotatably engaging said nut.

9. The combination set forth in claim 8 wherein said retainer means comprises a pair of washers, one at each end of said nut, each washer having a radially inwardly extending lug projecting into said slot and engaging said shoe.

10. The combination set forth in claim 9 wherein said nut is formed with an axially extending shoulder adjacent each end thereof, said washers being seated one against each of said shoulders for rotation relative to the nut.

11. The combination set forth in claim 10 including snap rings for retaining the washers seated against said shoulders.

12. The combination set forth in claim 11 wherein said lugs abut against the opposite ends of said shoe.

13. The combination set forth in claim 11 wherein the inner diameter of the washers in greater than the outer diameter of the shaft.

14. The combination set forth in claim 11 wherein the nut and the shaft are formed of steel and said washers are formed of a non-ferrous bearing material.

References Cited in the file of this patent

UNITED STATES PATENTS 2,480,282    Jackson _____ Sept. 28, 1949